United States Patent [19]
Perlowski et al.

[11] 3,818,203

[45] June 18, 1974

[54] MATRIX SHIFTER

[75] Inventors: Andrew A. Perlowski, Plano, Tex.; Robert H. Wallace, Clearwater, Fla.; Robert L. Magers, Tulsa, Okla.

[73] Assignee: Honeywell Inc., Minneapolis, Minn.

[22] Filed: Aug. 27, 1973

[21] Appl. No.: 391,610

[52] U.S. Cl. ........... 235/164, 340/166 R, 340/172.5
[51] Int. Cl. ............................................. G06f 7/00
[58] Field of Search .................... 235/164, 156, 152; 340/166, 172.5

[56] References Cited

UNITED STATES PATENTS

| | | | |
|---|---|---|---|
| 3,588,483 | 6/1971 | Lesniewski | 235/164 X |
| 3,731,073 | 5/1973 | Moylan | 235/152 |

OTHER PUBLICATIONS

W. R. Nordquist & W. N. Toy, "A Novel Rotate & Shift Circuit Using Bidirectional Gates" IEEE Trans. on Computers, pp. 802–808, Sept. 1970.

*Primary Examiner*—Malcolm A. Morrison
*Assistant Examiner*—David H. Malzahn
*Attorney, Agent, or Firm*—Molinare, Allegretti, Newitt & Witcoff

[57] ABSTRACT

The disclosure describes a matrix shifter comprising right and left shift conductors which operate switches controlling the flow of information from input conductors to output conductors. The switches are arranged in the form of a matrix so that logical, arithmetic and rotational multibit shifting can be achieved with a single pass by energizing at most two control shift conductors at a time.

10 Claims, 5 Drawing Figures

MATRIX SHIFTER

The invention herein described was made in the course of or under a contract or subcontract thereunder with the United States Government, Department of the Air Force.

BACKGROUND OF THE INVENTION

1. Field of the Invention

This invention relates to apparatus for shifting digital information and more specifically relates to shifters employing a matrix of switches.

2. General Description of the Prior Art

Recent advances in computer design have underlined various deficiencies of the shifting networks used in modern computers. Fast adders and a complex carry network allow a central processor of a computer to add 32 'bits of data in less than 100 nanoseconds, yet the same processor may be able to shift only 1 or 2 data bits in the same time period.

In the past, shifting has been accomplished by the use of shift registers, multiplexers and binary ranked shifters. However, each of these techniques has exhibited limitations which have limited its overall usefulness. In the case of shift registers, the time to execute a multibit shift is normally dependent on the number of shifts required. As a result, data is shifted at a much lower rate than arithmetic operations occur. The multiplexer approach is generally limited to single bit or two bit at a time shifts due to interconnection problems. Multibit shifts generally are realized only by cycling data through the processor in multiple passes. Binary ranked shifters require a large number of interconnections, and the sign extension required in 2's complement arithmetic shifts is generally cumbersome.

SUMMARY OF THE INVENTION

Accordingly, it is one object of the present invention to provide a shifter in which multibit shifts can be achieved in a single pass of data.

It is another object of the present invention to provide a shifter comprising a single circuit having a minimum number of interconnections.

Still another object of the present invention is to provide a shifter in which logical, arithmetic and rotational shifts can be achieved by energizing at most two control lines for a shift of any predetermined number of bits.

It is still another object of the present invention to provide a matrix shifter in which the flow of data between and output conductors is controlled by a single control line over one-half the matrix and by two control lines over the other half of the matrix so that logical, arithmetic, and circular shifting can be achieved with a minimum of complexity.

DESCRIPTION OF THE DRAWINGS

These and other objects, advantages and features of the present invention will appear in connection with the accompanying drawings in which.

DESCRIPTION OF THE PREFERRED EMBODIMENT

Figures 1, 2, 3:
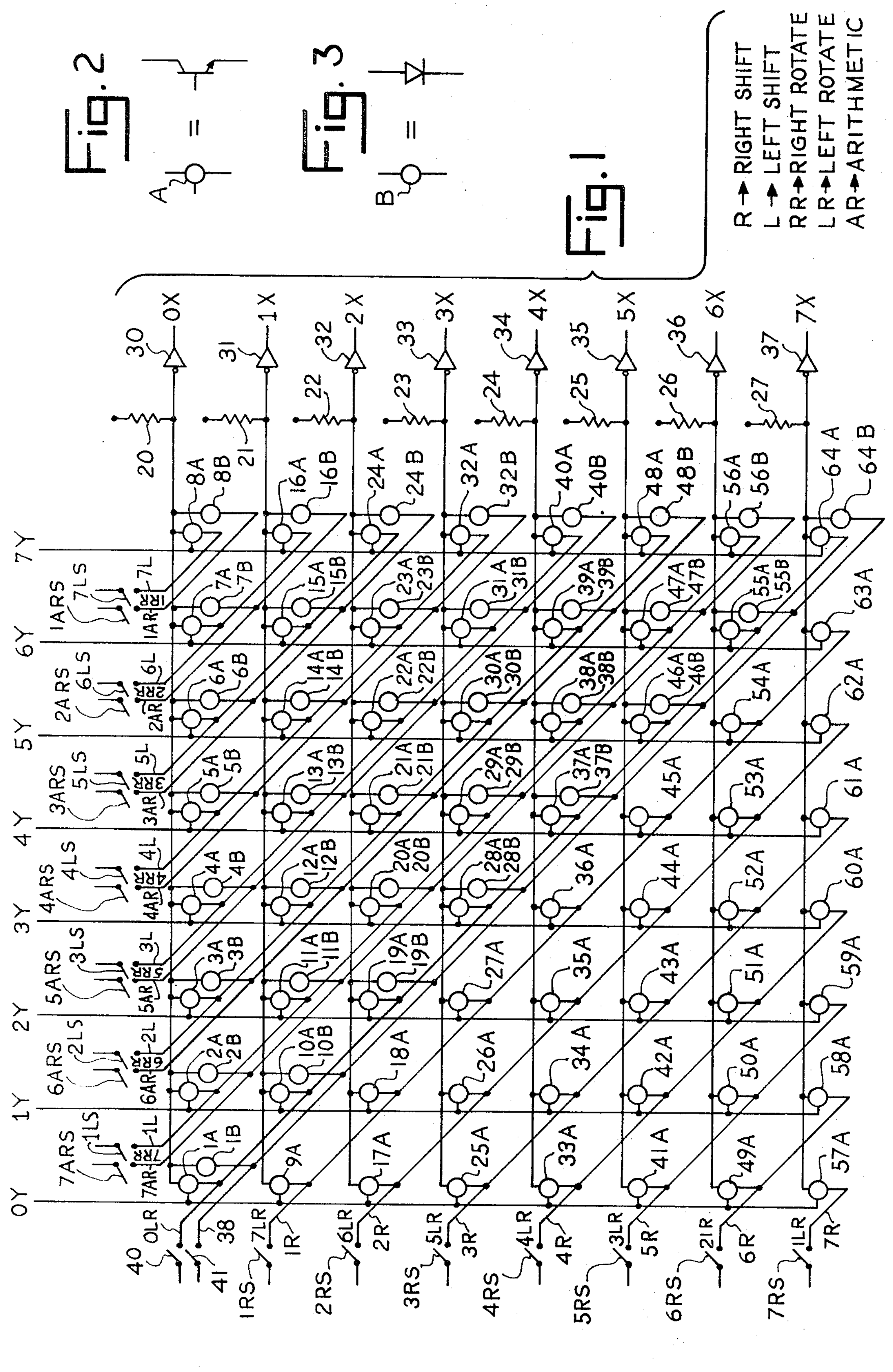
FIG. 1 is an electrical schematic diagram of a preferred form of 8-bit matrix shifter made in accordance with the present invention.
FIG. 2 is an electrical schematic diagram of a preferred form of shift switch made in accordance with the present invention.
FIG. 3 is an electrical schematic diagram of a preferred form of arithmetic right switch made in accordance with the present invention.

Referring to FIG. 1, the preferred embodiment of the present invention is useful in a computer which handles digital numbers in the form of information bits represented by discrete logic states. For example, input conductors 1Y–7Y could represent a 7 bit digital number in which conductor 1Y represents the most significant bit and conductor 7Y represents the least significant bit. Conductor OY would be used to represent the sign (i.e., + or −) bit of the number. The digital number transmitted on conductors OY–7Y could be represented in binary form in which a first potential level on a conductor would represent a logical 1 state and another different potential level would represent a logical 0 state. Thus, conductors OY–7Y would represent bit positions 0–7 respectively of the input number.

In such a system for handling digital numbers, output conductors OX–7X would correspond to input conductors OY–7Y, respectively, to represent bit positions 0–7 of a corresponding digital output number. That is, output conductors 1X–7X would be used to represent a 7 bit digital number and conductor OX would be used to represent the sign of the digital number. Resistors 20–27 and buffer amplifiers 30–37 normally bias output conductors OX–7X, respectively, to their 0 logic states.

Each of the input and output conductors represents a bit position of the digital number being transmitted. If the digital numbers are represented in conventional binary notation, each successive conductor from the least significant bit position to the most significant bit position would represent a place value increasing by a factor of two. For example, conductor 7Y would represent a place value of $2^0$, conductor 6Y would represent a place value of $2^1$, conductor 5Y would represent a place value of $2^2$, etc. The correspondingly-numbered output conductors would represent the same place values.

The bit positions of the bits of data represented on input conductors OY–7Y can be shifted by using the switching martrix shown in FIG. 1. The matrix comprises three-terminal switches 1A–64A connected as shown. A preferred form of one of the switches is illustrated in detail in FIG. 2. The switch comprises an NPN transistor having a base element connected to one of the vertical input conductors OY–7Y, a collector element connected to one of the horizontal output conductors OX–7X and an emitter element connected to one of the diagonal control conductors.

The switching matrix also comprises switches 1B–36B connected as shown. As illustrated in FIG. 3, a preferred form of the switch comprises a conventional diode having an anode element connected to one of the horizontal output conductors 0X–7X and having a cathode element connected to one of the diagonal control conductors.

The matrix also comprises a control switch 40 which can selectively energize a O shift conductor OLR in order to switch the digital number on input conductors OY–7Y to the output conductors without shifting any bits of information. When O shift conductor OLR is energized, input conductors OY–7Y representing input bit positions 0–7, respectively, are operatively connected to output conductors OX–7X which represent corresponding output bit positions 0–7, respectively. Each output conductor is switched to the same logic state as the input conductor representing the same relative bit position, so that the input number is effectively transferred to the output conductors.

The matrix also comprises right shift control switches 1RS–7RS which can selectively energize right shift conductors 1R–7R, respectively. Conductors 1R–7R represent right bit position shifts 1–7, respectively. Each of right shift conductors 1R–7R is connected to a set of right shift switches A. The total number of switches in each set equals the total number of input conductors (8), minus the right bit position shifts represented by the right shift conductor connected to the switches in the set. For example, right shift conductor 3R is connected to 8 minus 3 or 5 switches.

Each right shift switch within each right shift switch set operatively connects one of the input conductors to one of the output conductors representing a bit position exceeding the bit position of the input conductor by the number of right bit position shifts represented by the right shift conductor operating the switch. For example, if right shift conductor 3R is energized, switch 25A connects input conductor OY representing the 0 bit position to output conductor 3X representing the 3 bit position. Three exceeds zero by the right bit position shifts represented by conductor 3R, i.e., 3 bit position shifts.

The matrix also comprises control switches 1LS–7LS which can selectively energize left shift conductors 1L–7L respectively. Left shift conductors 1L–7L represent left bit position shifts 1–7, respectively. Each of conductors 1L–7L is connected to a set of left shift switch sets. The number of switches in each set equals the total number of input conductors minus the left bit position shifts represented by the shift conductor connected to the set. For example, the total number of switches in the switch set connected to conductor 6L, which represents 6 bit position shifts, equals 8 minus 6 or 2.

Each switch within the switch set connects an input conductor to an output conductor representing a bit position less than the bit position of the input conductor by the number of left bit position shifts represented by the left shift conductor operating the switch. For example, if left shift conductor 6L is energized, switch 7A connects input conductor 6Y representing bit position 6 to output conductor OX representing bit position 0. Zero is less than six by the left bit position shifts represented by conductor 6L, i.e., 6 bit position shifts.

In order to shift data on input conductors OY–7Y to the right, the right shift conductor representing the number of right bit positions to be shifted is energized. For example, in order to shift data 3 bit positions to the right, switch 3RS is closed so that conductor R3 is energized. In order to shift data on the input conductors to the left, the left shift conductor representing the number of left bit positions to be shifted is energized. For example, if the data is to be shifted 6 bit positions to the left, switch 6LS is closed in order to energize conductor 6L.

In order to rotate data on the input conductors to the right, the right shift conductor representing the number of right bit positions to be rotated is energized simultaneously with the left shift conductor representing the number of left bit position shifts equal to the number of input conductors minus the number of right bit positions to be rotated. For example, if data is to be rotated 3 bit positions to the right, switch 3RS is closed to energize conductor 3R, and, simultaneously, switch 5LS is closed to energize conductor 5L. In order to rotate data on the input conductors to the left, the left shift conductor representing the number of left bit positions to be rotated is energized simultaneously with the right shift conductor representing the number of right bit position shifts equal to the number of input conductors minus the number of left bit positions to be rotated. For example, if the data is to be rotated 2 bit positions to the left, switch 2LS is closed to energize conductor 2L, and, simultaneously, switch 6RS is closed to energize conductor 6R.

In order to switch each of the output conductors to its 1 logic state, switch 41 is closed to energize conductor 38.

Approximately one-half the matrix is fitted with arithmetic right shift switches 1ARS–7ARS which are used to energize arithmetic right shift conductors 1AR–7AR, respectively. These conductors are used to switch certain of the output conductors to their 1 state if the sign bit of the number on the input conductors is negative, that is, switched to its logical 1 state.

Figure 4A:
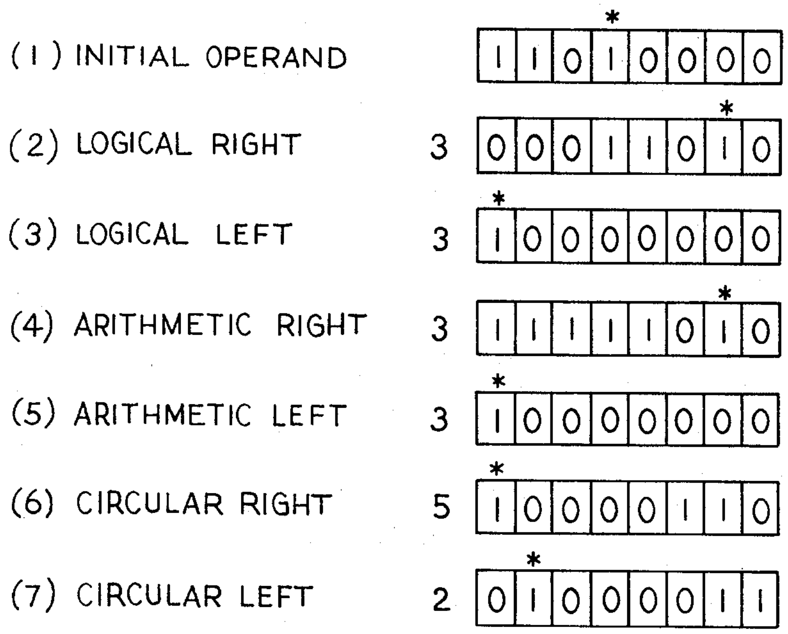
FIG. 4A is a diagram illustrating the manner in which the preferred shifter is capable of performing logical, arithmetic and circular shifts on an initial operand number.
Figure 4B:
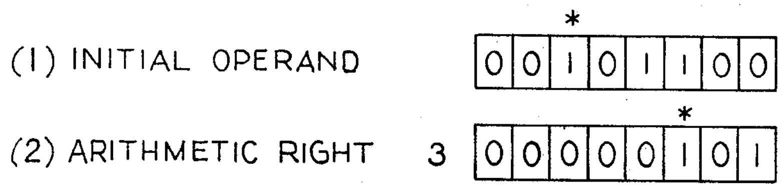
FIG. 4B is a diagram illustrating the method in which the preferred shifter can perform arithmetic right shifts when the sign bit of an inital operand number is positive.

An example of the operation of the matrix will now be described in connection with FIGS. 4A and 4B. Each input conductor of the matrix is connected to an output conductor through a switch that is controlled by a diagonal control conductor. The diagonal control conductor is coded to indicate the type of shift and the number of bit positions shifted when the conductor is activated. The control conductors are deactivated when the matrix is not used, and, at that time, the output conductors are biased to their logical 0 states. If the matrix is required to pass data without performing a shift, control switch 40 is closed so that conductor OLR is energized. Each input is then subjected to a single node delay and an output buffer delay so that the data appearing on each input conductor is quickly switched to the corresponding output conductor. As a result, no data conflicts are encountered.

If a logical right shift of 3 bit positions is required, control switch 3RS is closed to energize conductor 3R. Input conductor OY is operatively connected to output conductor 3X, input conductor 1Y is operatively connected to output conductor 4X, etc. Output conductors OX–2X are not switched and these output conductors remain at their logical 0 states. This is a proper condition for a logical right shift. As in the case where no shifts were desired, only a single node delay and an output buffer delay are required in order to shift the data 3 bit positions from the input conductors to the output conductors. Assuming the number on input conductors OY–7Y is illustrated in FIG. 4A1, the resulting number on the output conductors is illustrated by FIG. 4A2.

A logical left 3 bit position shift is handled in the manner described above except that conductor 3LS is closed to energize shift conductor 3L. In this case, the data on the input conductors is shifted three positions to the left resulting in the number shown at FIG. 4A3.

An arithmetic right shift of 3 bit positions would be handled in the same manner described above for the logical right shift except that the state of output lines OX–2X is controlled by the value of the sign bit on input conductor OY. If the sign bit is a logical 0, then the previously described shift is correct. If the sign bit is a logical 1, output conductors OX–2X must be conditioned to their logical 1 states. In order to achieve this result, switches 3RS and 3ARS are simultaneously closed so that output conductors OX–2X are switched to their logical 1 states by means of the B switches connected to conductor 3AR. The results of an arithmetic right shift of 3 bit positions is shown in FIGS. 4B1 and 4B2 in the case of a logical zero sign bit and by FIGS. 4A1 and 4A4 in the case of a logical 1 sign bit.

An arithmetic left shift of 3 bit positions is handled as an arithmetic right shift except that conductor 3L alone is energized irrespective of the sign bit. The results of an arithmetic left 3 bit position shift is illustrated by FIGS. 4A1 and 4A5.

Right rotational shifting requires the use of two digital control conductors. In a right rotational shift of 5 bit positions, switch 5RS is closed to energize line 5R and switch 3LS is closed to energize conductor 3L. In addition to the shifting achieved by conductor 5R, conductor 3L operatively connects input conductor 3Y to output conductor OX, input conductor 4Y to output conductor 1X, input conductor 5Y to output conductor 2X, etc., in order to achieve a right rotation. The results of this shifting is illustrated in FIGS. 4A1 and 4A6.

Similar shifting takes place for a left rotational shift. For example, if the data is rotated 2 bit positions to the left, switch 2LS is closed to energize conductor 2L and switch 6RS is closed to energize conductor 6R. The results of the left rotational shift is schematically shown in FIGS. 4A1 and 4A7.

Those skilled in the art will appreciate that the unique construction of the matrix enables the right and left rotational shifting to be achieved by merely energizing two control conductors simultaneously. This is an important feature which enables complete rotational shifting to occur with a minimum of circuitry.

Those skilled in the art will recognize that the concept described herein can be extended to 16 and 32 bit shifters. In addition, other modifications of the preferred form of the invention shown herein can be achieved without departing from the true spirit and scope of the invention as defined in the appended claims.

What is claimed is:

1. In a system for handling digital data in the form of N information bits represented by discrete logic states including a plurality of N input conductors representing bit positions 0 through N minus 1, where N is a positive integer, improved apparatus for shifting the data with respect to the bit positions comprising:

N output conductors representing bit positions 0 through N minus 1;

a zero shift conductor for transmitting a zero shift signal;

zero shift switch means operatively connecting each input conductor to a corresponding output conductor representing a like bit position for switching each output conductor to the same logic state as the corresponding input conductor in response to the zero shift signal;

right shift conductors representing right bit position shifts;

right shift switch sets representing right bit position shifts, each switch set being operated by one of said right shift conductors representing a like right bit position shift;

right shift switch means in each right shift switch set for operatively connecting one of said input conductors to one of said output conductors representing a bit position exceeding the bit position of said one input conductor by the number of right bit position shifts represented by the right shift conductor operating the switch means;

left shift conductors representing left bit position shifts;

left shift switch sets representing left bit position shifts, each switch set being operated by one of said left shift conductors representing a like left bit position shift;

left shift means in each left shift switch set for operatively connecting one of said input conductors to one of said output conductors representing a bit position less than the bit position of the one input conductor by the number of left bit position shifts represented by the left shift conductor operating the left shift switch means;

first control means for shifting the data present on the input conductors to the right by energizing the right shift conductor representing the number of right bit positions to be shifted;

second control means for shifting the data present on the input conductors to the left by energizing the left shift conductor representing the number of left bit positions to be shifted;

third control means for rotating the data present on the input conductors to the right by energizing the right shift conductor representing the number of right bit positions to be rotated and by energizing the left shift conductor representing N minus the number of right bit positions to be rotated; and fourth control means for rotating the data present on the input conductors to the left by energizing the left shift conductor representing the number of left bit positions to be rotated and by energizing the right shift conductor representing N minus the number of left bit positions to be rotated.

2. Apparatus, as claimed in claim 1, wherein each switch means comprises a semi-conductor switching device.

3. Apparatus, as claimed in claim 1, wherein each switch means comprises a transistor having a base element operatively connected to an input conductor, a collector element operatively connected to an output conductor and an emitter element operatively connected to a shift conductor.

4. Apparatus, as claimed in claim 1, wherein the number of right shift conductors equals N minus 1 and wherein the right shift conductors represent right bit position shifts 1 through N minus 1.

5. Apparatus, as claimed in claim 4, wherein the number of left shift conductors equals N minus 1 and wherein the left shift conductors represent left bit position shifts 1 through N minus 1.

6. Apparatus, as claimed in claim 5, wherein the number of right shift switch sets equals N minus 1 and wherein the right shift switch sets represent right bit position shifts 1 through N minus 1.

7. Apparatus, as claimed in claim 6, wherein the number of left shift switch sets equals N minus 1 and wherein the left shift switch sets represent left bit position shifts 1 through N minus 1.

8. Apparatus, as claimed in claim 1, wherein the number of right shift switch means in each right shift switch set equals N minus the right bit position shifts represented by said set.

9. Apparatus, as claimed in claim 8, wherein the number of left shift switch means in each left shift switch set equals N minus the left bit position shifts represented by said set.

10. Apparatus, as claimed in claim 1, and further comprising:

arithmetic right shift conductors representing arithmetic right bit position shifts 1 through N minus 1;

N minus 1 sets of arithmetic right switches representing arithmetic right bit position shifts 1 through N minus 1, each set operatively connecting a corresponding arithmetic right shift conductor representing a like number of bit position shifts to each of the output conductors representing a bit position equal to or less than the said like number of bit position shifts minus 1; and fifth control means for energizing the arithmetic right shift conductor representing bit position shifts equal to the number of positions to be shifted right at the same time the first control means energizes the right shift conductor representing the number of right bit positions to be shifted, so that the output conductors are operatively connected to the energized arithmetic right shift conductor by the switches, whereby the output conductors are switched to a predetermined logic state.

* * * * *